United States Patent
Chen et al.

(10) Patent No.: US 6,723,299 B1
(45) Date of Patent: Apr. 20, 2004

(54) SYSTEM AND METHOD FOR MANIPULATING NANOTUBES

(75) Inventors: Jian Chen, Richardson, TX (US); Mark J. Dyer, San Jose, CA (US)

(73) Assignee: Zyvex Corporation, Richardson, TX (US)

( * ) Notice: Subject to any disclaimer, the term of this patent is extended or adjusted under 35 U.S.C. 154(b) by 72 days.

(21) Appl. No.: 10/044,317

(22) Filed: Jan. 11, 2002

Related U.S. Application Data

(60) Provisional application No. 60/291,101, filed on May 17, 2001.

(51) Int. Cl.$^7$ ................................................. D01F 9/12
(52) U.S. Cl. ............................. 423/447.1; 423/447.2; 423/460; 241/16
(58) Field of Search .................. 423/447.2, 460, 423/455 R, 447.1; 241/16

(56) References Cited

U.S. PATENT DOCUMENTS

| | | |
|---|---|---|
| 5,482,601 A | 1/1996 | Ohshima et al. |
| 5,753,088 A | 5/1998 | Olk |

OTHER PUBLICATIONS

U.S. patent application Ser. No. 60/291,101, Chen.
Ajayan, P.M., "Nanotubes from Carbon," Chem. Rev. 1999, 99, 1787–1799.
Yakobson, Boris I. et al., "Fullerene Nanotubes: $C_{1,000,000}$ and Beyond," American Scientist, 1997, vol. 85, 324–338.
Rinzler, A.G., et al., "Large–scale purification of single–wall carbon nanotubes: process, product, and characterization," Appl. Phys. A 67, 29–37 (1998).
Journet C., et al., "Large–scale production of single–walled carbon nanotubes by the electric–arc technique," Nature, vol. 388/Aug. 1997, 756–758.
Journet, C., et al., "Production of carbon nanotubes," Appl. Phys. A 67, 1–9 (1998).
Nikolaev, Pavel et al., "Gas–phase catalytic growth of single–walled carbon nanotubes from carbon monoside," Chemical Physics Letters 313 (1999) 91–97.
Liu, Jie et al., "Fullerene Pipes," Science, vol. 280, 1998, 1253–1256.
Stepanek, I. et al., "Nano–mechanical cutting and opening of single wall carbon nanotubes," Chemical Physics Letter 331 (2000) 125–131.
Szejtili, Jozsef, "Introduction and General Overview of Cyclodextrin Chemistry," Chem. Rev. 1998, 98, 1743–1753.
Chen, Jian et al., "Dissolution of Full–Length Single–Walled Carbon Nanotubes," J. Phys. Chem B 2001, 105, 2525–2528.
Niyogi, S. et al., "Chromatographic Purification of Soluble single–Walled Carbon Nanotubes (s–SWNTs)," J. Am. Chem. Soc., 2001, 123, 733–734.
Dresselhaus, M.S. et al., "Science of Fullerenes and Carbon Nanotubes," 1996, San Diego: Academic Press, 901–908.

*Primary Examiner*—Stuart L. Hendrickson
*Assistant Examiner*—Peter J Lish
(74) *Attorney, Agent, or Firm*—Haynes and Boone, LLP

(57) ABSTRACT

A system and method are disclosed which allow for manipulation of nanotubes. More specifically, embodiments of the present invention enable various types of manipulation of nanotubes utilizing an organic material that is presented to the nanotubes. For example, a preferred embodiment of the present invention enables cutting of nanotubes into shortened nanotubes. Other types of nanotube manipulation that are enabled by embodiments of the present invention, include dispersing nanotubes, enabling dissolution of nanotubes, and noncovalently fuctionalizing nanotubes. The organic material utilized in manipulating nanotubes preferably comprises a soft organic material, soluble organic material, and/or an organic material that acts as a dispersing reagent for dispersing nanotubes. In a preferred embodiment, the organic material utilized for manipulating nanotubes comprises cyclodextrin.

78 Claims, 10 Drawing Sheets

SYSTEM AND METHOD FOR MANIPULATING NANOTUBES

CROSS-REFERENCE TO RELATED APPLICATIONS

This application claims the benefit of co-pending U.S. provisional patent application assigned serial No. 60/291,101 entitled "Cyclodextrin mediated soft cutting of single-walled carbon nanotubes" filed May 17, 2001, the disclosure of which is hereby incorporated herein by reference.

BACKGROUND OF THE INVENTION

1. Technical Field

The present invention is related to manipulating nanotubes, and more particularly to a system and method that utilize organic material, such as cyclodextrin, to manipulate nanotubes, such as carbon nanotubes, by, for example, dispersing and/or cutting the nanotubes.

2. Background

A carbon nanotube can be visualized as a sheet of hexagonal graph paper rolled up into a seamless tube and joined. Each line on the graph paper represents a carbon-carbon bond, and each intersection point represents a carbon atom.

In general, carbon nanotubes are elongated tubular bodies which are typically only a few atoms in circumference. The carbon nanotubes are hollow and have a linear fullerene structure. The length of the carbon nanotubes potentially may be millions of times greater than their molecular-sized diameter. Both single-walled carbon nanotubes (SWNTs), as well as multi-walled carbon nanotubes (MWNTs) have been recognized see "Nanotubes from Carbon" by P. M. Ajayan, *Chem. Rev.* 1999, 99, 1787–1799, the disclosure of which is hereby incorporated herein by reference).

Carbon nanotubes are currently being proposed for a number of applications since they possess a very desirable and unique combination of physical properties relating to, for example, strength and weight. Carbon nanotubes have also demonstrated electrical conductivity. See Yakobson, B. I., et al., *American Scientist*, 85, (1997), 324–337; and Dresselhaus, M. S., et al., Science of Fullerenes and Carbon Nanotubes, 1996, San Diego: Academic Press, pp. 902–905. For example, carbon nanotubes conduct heat and electricity better than copper or gold and have 100 times the tensile strength of steel, with only a sixth of the weight of steel. Carbon nanotubes may be produced having extraordinarily small size. For example, carbon nanotubes are being produced that are approximately the size of a DNA double helix (or approximately $1/50,000^{th}$ the width of a human hair).

Considering the excellent properties of carbon nanotubes, they are well suited for a variety of uses, from the building of computer circuits to the manufacturing of heat-reflective material, and even to the delivery of medicine. As a result of their properties, carbon nanotubes may be useful in microelectronic device applications, for example, which often demand high thermal conductivity, small dimensions, and light weight. Perhaps most promising is their potential to act as nano-wires and even tiny transistors in ultradense integrated circuits. One potential application of carbon nanotubes that has been recognized is their use in flat-panel Cd displays that use electron field-emission technology (as carbon nanotubes generally make excellent pipes for the high-energy electrons). Further potential applications that have been an[] recognized include electromagnetic shielding, such as for cellular telephones and laptop if computers, radar absorption for stealth aircraft, nano-electronics (including memories in new generations of computers), and use as high-strength, lightweight composites. Further, carbon nanotubes are potential candidates in the areas of electrochemical energy storage systems (e.g., lithium ion batteries) and gas storage systems.

Various techniques for producing carbon nanotubes have been developed. As examples, methods of forming carbon nanotubes are described in U.S. Pat. Nos. 5,753,088 and 5,482,601, the disclosures of which are hereby incorporated herein by reference. The three most common techniques for producing carbon nanotubes are: 1) laser vaporization technique, 2) electric arc technique, and 3) gas phase technique (e.g., HIPCO™ process), which are discussed further below.

In general, the "laser vaporizations" technique utilizes a pulsed laser to vaporize graphite in producing the carbon nanotubes. The laser vaporization technique is further described by A. G. Rinzler et al. in *Appl. Phys. A*, 1998, 67, 29, the disclosure of which is hereby incorporated herein by reference. Generally, the laser vaporization technique produces carbon nanotubes that have a diameter of approximately 1.1 to 1.3 nanometers (nm). Such laser vaporization technique is generally a very low yield process, which requires a relatively long period of time to produce small quantities of carbon nanotubes. For instance, one hour of laser vaporization processing typically results in approximately 100 milligrams of carbon nanotubes.

Another technique for producing carbon nanotubes is the "electric arc" technique in which carbon nanotubes are synthesized utilizing an electric arc discharge. As an example, single-walled nanotubes (SWNTs) may be synthesized by an electric arc discharge under helium atmosphere with the graphite anode filled with a mixture of metallic catalysts and graphite powder (Ni:Y;C, as described more fully by C. Journey et al. in *Nature* (London), 388 (1997), 756. Typically, such SWNTs are produced as close-packed bundles (or "ropes") with such bundles having diameters ranging from 5 to 20 nm. Generally, the SWNTs are well-aligned in a two-dimensional periodic triangular lattice bonded by van der Waals interactions. The electric arc technique of producing carbon nanotubes is further described by C. Journey and P. Bernier in *Appl. Phys. A*, 67, 1, the disclosure of which is hereby incorporated herein by reference. Utilizing such an electric arc technique, the average carbon nanotube diameter is typically approximately 1.3 to 1.5 nm and the triangular lattice parameter is approximately 1.7 nm. As with the laser vaporization technique, the electric arc production technique is generally a very low yield process that requires a relatively long period of time to produce small quantities of carbon nanotubes. For instance, one hour of electric arc processing typically results in approximately 100 milligrams of carbon nanotubes.

Thus, both the laser vaporization technique and electric arc technique can only produce small quantities of SWNTs, See A. G. Rinzler et al, *Appl Phys. A*, 1998, 67, 29–37; C. Journey and P. Bernier, ppl. *Phys. A*, 1998, 67, 1–9. More recently, Richard Smalley and his colleagues at Rice University have discovered another process, the "gas phase" technique, which produces much greater quantities of carbon nanotubes than the laser vaporization and electric arc production techniques. The gas phase technique, which is referred to as the HIPCO process, produces carbon nanotubes utilizing a gas phase catalytic reaction. The HIPCO process uses basic industrial gas (carbon monoxide) under temperature and pressure conditions common in modem industrial plants to create relatively high quantities of high-purity carbon nanotubes that are essentially free of by-products. The HIPCO process is described in further detail by P. Nikolaev et al. in *Chem. Phys. Lett.*, 1999, 313, 91, the disclosure of which is hereby incorporated herein by reference.

While daily quantities of carbon nanotubes produced using the above-described laser vaporization and electric arc techniques are approximately 1 gram per day, the HIPCO process may enable daily product of carbon nanotubes in quantities of a pound or more. Generally, the HIPCO technique produces carbon nanotubes that have relatively much smaller diameters than are typically produced in the laser vaporization or electric arc techniques. For instance, the nanotubes produced by the HIPCO technique generally have diameters of approximately 0.7 to 0.8 nanometer (nm).

Carbon nanotubes are commonly produced (e.g., using the above-described as techniques) in relatively long, highly tangled ropes. For example, SWNTs produced by the HIPCO process (which are available from Carbon Nanotechnologies, Inc.) generally comprise if relatively long (e.g., >4 micrometers ($\mu$m)) and relatively thick (e.g., 20–100 nm) ropes formed by a plurality of highly tangled carbon nanotubes.

A desire often exists for a nanotube structure that is shorter than the relatively long tubes commonly produced. Shortened single-walled carbon nanotubes (e.g., SWNTs having length $\leq 1$ $\mu$m) will have a rich chemistry due to their higher chemical processability. For example, shortened SWNTs can be further sorted by length, chemically functionalized, solubilized and chromatographically purified (J. Liu et al, *Science* 1998, 11, 834–840; S. Niyogi et al, *J. Am. Chem. Soc.* 2001, 123, 733–734). Accordingly, such shortened SWNTs are the fitting subjects of a new branch of organic chemistry, a molecular nanotechnology of great promise. Processable shortened SWNTs can be further polymerized and copolymerized to form nanotube-based polymer composites and copolymers which will find applications in the areas of electromagnetic shielding coatings for military aircraft and ships as well as mobile telephones (e.g., cellular telephones) and laptops, antistatic coatings (e.g., for automobiles), and organic thin film devices for microelectronics and micro-optoelectronics. Shortened SWNT materials, due to their high density of open ends, will also find applications in electrochemical energy storage systems for lithium batteries and hydrogen storage systems for fuel cells. In addition, shortened SWNTs, after appropriate conversion (solubilization, exfoliation and chemical functionalization), are promising one-dimensional building blocks for constructing advanced nanoscale structures which may find important applications in molecular electronics.

Various techniques have been proposed for shortening (or "cutting") carbon nanotubes to result in nanotubes having a length shorter than that at which the nanotubes are produced. One technique for shortening the length of carbon nanotubes utilizes prolonged sonication of carbon nanotubes to a mixture of concentrated sulfuric and nitric acids, as described more fully in "Fullerene Pipes" by Jie Liu et al. published in *Science*, volume 280 (pages 1253–1256) on May 22, 1998, the disclosure of which is hereby incorporated herein by reference. Liu et al. found that the length distribution of the carbon nanotubes exposed to the concentrated sulfuric and nitric acids shortened systematically with exposure time to the acid.

One disadvantage of Liu et al's method is that the yield of shortened SWNTs is low. The total yield (after shortening and polishing steps) is approximately 30% or less, thus only a small amount of usable shortened carbon nanotubes can be obtained from the purified SWNTs using such acid-cutting technique. Also, while this acid-cutting technique does effectively shorten the length of carbon nanotubes having relatively large diameters (e.g. the SWNTs produced by laser vaporization or electric arc production techniques), it is not a suitable solution for shortening SWNTs having smaller diameters, such as those typically produced by the HIPCO process (e.g., approximately 0.7 to 0.8 nm diameter). Because of the higher chemical reactivity due to strain in small diameter nanotubes, it appears that the acid-cutting technique may not be suitable for cutting such small diameter SWNTs. For example, after 12 hour sonication of 10 mg of SWNTs (produced by the HIPCO process) in 12 ml of 3:1 mixture of concentrated sulfuric acid ($H_2SO_4$)/nitric acid ($HNO_3$), it was found by transmission electron microscopy (TEM) that most of such small-diameter SWNTs were severely damaged.

Another proposed technique for shortening the length of carbon nanotubes utilizes diamond particles as an abrasive material for cutting such carbon nanotubes, as described more fully in "Nano-mechanical cutting and opening of single wall carbon nanotubes" by I. Stepanek et al. in *Chem. Phys. Lett.*, 2000, 331, 125–131, the disclosure of which is hereby incorporated herein by reference. In such technique, diamond particles are used to effectively grind the carbon nanotubes in order to cut them into shortened nanotubes. This technique has a better yield than the above-described acid-cutting technique. However, it would be very difficult to separate the shortened SWNTs from the small diamond particles, because both materials are insoluble in organic or inorganic solvents.

BRIEF SUMMARY OF THE INVENTION

The present invention is directed to a system and method which allow for manipulation of nanotubes. More specifically, embodiments of the present invention enable various types of manipulation of nanotubes utilizing an organic material that is presented to the nanotubes. For example, a preferred embodiment of the present invention enables cutting of nanotubes into shortened nanotubes. As another example, certain embodiments enable dispersing of a plurality of nanotubes. As yet another example, certain embodiments enable in dissolution of nanotubes. As still another example, certain embodiments enable noncovalent functionalization of nanotubes with an organic material presented thereto. Thus, one or more of various different types of nanotube manipulation may be enabled by embodiments of the present invention, including, without limitation, cutting nanotubes, dispersing nanotubes, dissolution of nanotubes, and noncovalently functionalizing nanotubes.

According to one embodiment of the present invention, the organic material utilized in manipulating (e.g., cutting, dispersing, etc.) nanotubes comprises a soft organic material. According to another embodiment of the present invention, a soluble organic material is utilized for manipulating nanotubes. According to yet another embodiment of the present invention, a soft organic material that is soluble is utilized for manipulating nanotubes. According to still another embodiment, an organic material that acts as a dispersing reagent for dispersing nanotubes is utilized for manipulating (e.g., dispersing, cutting, etc.) nanotubes. In a preferred embodiment, the organic material utilized for manipulating nanotubes comprises cyclodextrin.

A preferred embodiment enables a process for cutting nanotubes that uses an organic material. In such cutting process of a preferred embodiment, an organic material is presented to the nanotubes, and a mechanical force is then applied to the nanotubes to result in cutting of at least one of the nanotubes. Most preferably, the organic material (e.g., cyclodextrin) utilized in the cutting process is soluble to enable the resulting shortened nanotubes to be easily separated from such organic material.

According to one embodiment of the present invention, a method for cutting nanotubes comprises exposing at least one nanotube having a first length to a soft organic material, and grinding the nanotube with the soft organic material to result in at least one shortened nanotube having a length that is shorter than the first length.

According to another embodiment of the present invention, a method for manipulating nanotubes comprises obtaining a nanotube rope that comprises a plurality of nanotubes, and presenting a solid-state nanotube dispersing reagent to the nanotube rope to disperse at least a portion of the plurality of nanotubes.

According to another embodiment of the present invention, a method for dissolution of nanotubes comprises presenting a nanotube-dispersing reagent to a plurality of nanotubes in at least one solvent, and using the nanotube-dispersing reagent to disperse at least a portion of the plurality of nanotubes.

According to another embodiment of the present invention, a method for functionalization of nanotubes comprises presenting an organic material to a plurality of nanotubes, and the organic material selectively noncovalently functionalizing at least one of the plurality of nanotubes based at least in part on nanotube diameter size.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Various embodiments of the present invention are now described with reference to the above figures. Certain embodiments of the present invention enable use of soft organic materials, such as cyclodextrins, for shortening the length of (or "cutting") nanotubes. Generally, a "nanotube" is a tubular, strand-like structure that has a circumference on the atomic scale. The diameter of such a nanotube typically ranges from approximately 0.4 nm to approximately 100 mn, and most typically have diameters ranging from approximately 0.7 nm to approximately 5 nm (e.g., when produced utilizing the above-described common production techniques).

The nanotube may be formed from various materials such as, for example, carbon, boron nitride, and composites thereof. Nanotubes are typically formed from carbon. As If described above, nanotubes are commonly formed as a fullerene molecule containing a hexagonal lattice structure. The nanotubes may be single-walled nanotubes or multi-walled nanotubes. As an example, single-walled carbon nanotubes (SWNTs) may be cut using soft If organic materials in accordance with certain embodiments of the present invention. As a further example, multi-walled carbon nanotubes (MWNTs) may be cut using such materials in accordance with certain embodiments of the present invention. A preferred embodiment is utilized for cutting carbon nanotubes, and most preferably single-walled carbon nanotubes (SWNTs). Although, certain embodiments may be utilized for cutting various other types of: nanotubes, including without limitation multi-walled carbon nanotubes (MWNTs). As used herein, "nanotubes" are not limited solely to carbon nanotubes. Rather, the term "nanotubes" is used broadly herein and, unless otherwise qualified, is intended to encompass any type of nanotube now known or later developed.

Figure 1:
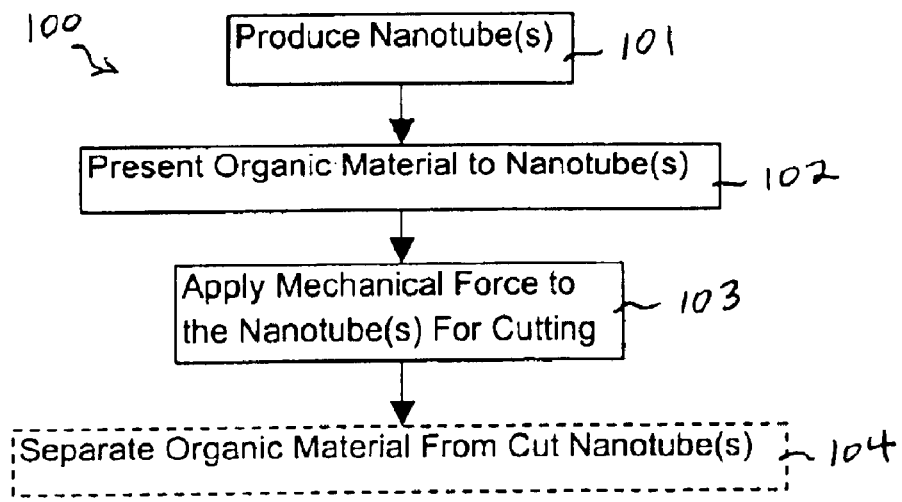
FIG. 1 shows an exemplary nanotube cutting process of a preferred embodiment.

While embodiments of the present invention have applicability other than or in addition to cutting nanotubes (as described further below), a preferred embodiment is applicable for cutting nanotubes. Turning to FIG. 1, an exemplary cutting process 100 in accordance with a preferred embodiment of the present invention is shown. In step 101, nanotubes are produced through some method now known or later developed. As described above, nanotubes are commonly produced by such techniques as laser vaporization, electric arc, and gas phase catalytic reaction as individual nanotubes and/or ropes that comprise a plurality of individual nanotubes. Generally, the nanotubes, as produced by such techniques, have lengths much greater than their diameters (e.g., the length of a nanotube may be millions of times greater than its diameter).

For example, the above-described laser vaporization technique generally produces nanotubes having a diameter ranging from approximately 1.1 nm to approximately 1.3 nm, and the above-described electric arc technique generally produces nanotubes having a diameter ranging from approximately 1.3 nm to approximately 1.5 nm. As another example, the above-described gas phase process generally produces nanotubes having a diameter ranging from approximately 0.7 nm to approximately 0.8 nm. Also, the nanotubes, as produced, generally have a relatively long length compared to their diameter. For example, as produced, the nanotubes may have a length of greater than 4 $\mu$m. Embodiments of the present invention enable the lengths of such nanotubes to be shortened by effectively cutting them.

In step 102 of the exemplary cutting process 100, an organic material is presented to the nanotubes. According to one embodiment of the present invention, a soft organic material is utilized for cutting the nanotubes. As used herein, "soft materials" are those materials softer than diamond, unless otherwise qualified. According to another embodiment of the present invention, a soluble organic material is utilized for cutting the nanotubes. According to yet another embodiment of the present invention, a soft organic material that is soluble is utilized for cutting the nanotubes. According to still another embodiment, a material that acts as a dispersing reagent for dispersing nanotubes is utilized for cutting such nanotubes. As described further below, in a preferred embodiment, the material utilized for cutting nanotubes comprises cyclodextrin.

In a preferred embodiment, cyclodextrin is utilized as the soft, organic material for cutting nanotubes. However, in other embodiments other similar soft (and/or soluble) organic materials may be utilized, such as any material comprising at least one glucopyranose unit, any material comprising at least one monosaccharide unit, any material comprising at least one cyclic oligosaccharides, any material comprising at least one cyclic polysaccharides, any material comprising at least one linear oligosaccharides, any material comprising at least one branched oligosaccharides, any material comprising at least one linear polysaccharides, and any material comprising at least one branched polysaccharides.

In embodiments of the present invention, the soft and/or soluble organic material is presented to individual nanotubes and/or nanotube ropes, and a mechanical force is then applied, in step 103, to the material and nanotubes to result in cutting of at least one of the nanotubes. More specifically, a grinding force may be utilized to grind the nanotubes with the soft and/or soluble organic material to effectively perform mechanical cutting of the nanotubes. For ease of explanation and consistency with a preferred embodiment of the present invention, such soft and/or soluble organic material may be referred to hereafter in describing aspects of a preferred embodiment as cyclodextrin; although, it should be understood that the scope of the present invention is not intended to be so limited.

As described above, grinding of nanotubes with hard diamond particles in order to cut the nanotubes has been proposed by Stepanek et al. Considering that diamond is such a hard material, it is not surprising that diamond particles are capable of cutting the nanotubes. However, in accordance with embodiments of the present invention, it is recognized, unexpectedly, that certain soft materials and/or soluble materials, such as cyclodextrins, may be used to effectively cut the nanotubes.

In step 104 of process 100, which is optional in a preferred embodiment, the organic material presented in step 102 is separated from the cut nanotubes. Most preferably, the organic material (e.g., cyclodextrin) utilized in the cutting process is soluble to enable the resulting shortened nanotubes to be easily separated from such organic material. In the above-described mechanical cutting process that uses diamonds as the abrasive material for cutting nanotubes, difficulty may be encountered separating the resulting shortened nanotubes from the diamond particles because both materials are insoluble. However, in certain embodiments of the present invention, the organic material utilized is soluble, which enables easy separation of the shortened nanotubes from such material. For instance, cyclodextrins are soluble in water, while nanotubes are generally insoluble. Thus, the mixture of shortened nanotubes and cyclodextrins remaining after the cutting process of a preferred embodiment may be washed with water to separate the shortened nanotubes from the cyclodextrins. Preferably, the shortened nanotubes resulting from the cutting process of a preferred embodiment have the same diameter as they had before the cutting process. Further, it should be recognized that the cutting process preferably has a 100% yield. That is, potentially, all of the nanotube material remains after the cutting process.

The environmentally benign solid-state grinding process of a preferred embodiment can be scaled up easily at low cost (e.g., scaling-up by any types of milling and grinding technologies), which will enable commercial production of shortened nanotubes ($\leq 1$ $\mu$m) in large scale. The solid-state process of a preferred embodiment avoids not only sonication in hazardous strong acids and oxidants, which can damage the small diameter nanotubes, but also avoids lengthy sonication in any solvent, thereby enabling the process to be easily scaled up.

According to a preferred embodiment, cyclodextnins are utilized for cutting nanotubes. In general, cyclodextrins comprise a family of three well-known industrially produced major, and several rare, minor cyclic oligosaecharides. The three major cyclodextrins are crystalline, homogeneous, nonhygroscopic substances, which are torus-like macrorings built up from glucopyranose units. In general, the most important, industrially produced cyclodextrins are the alpha- ($\alpha$-) cyclodextrin, beta- ($\beta$-) cyclodextrin, and gamma- ($\gamma$-) cyclodextrin. The $\alpha$-cyclodextrin (e.g., Schardinger's $\alpha$-dextrin, cyclomaltohexaose, cyclohexaglucan, cyclohexaamylose, $\alpha$-CD, ACD, C6A) comprises six glucopyranose units, the $\beta$-cyclodextrin (e.g., Schardinger's $\beta$-dextrin, cyclomaltoheptaose, cycloheptaglucan, cycloheptaamylose, $\beta$-CD, BCD, C7A) comprises seven such units, and the $\gamma$-cyclodextrin (e.g., Schardinger's $\gamma$-dextrin, cyclomaltooctaose, cyclooctaglucan, cyclooctaamylose, $\gamma$-CD, GCD, C8A) comprises eight such units. Cyclodextrins are further described in "Introduction and General Overview of Cyclodextrin Chemistry" by J. Szejtli, *Chem. Rev.*, 1998, 98, 1743–1753, the disclosure of which is hereby incorporated herein by reference. Cyclodextins also include other larger compounds, such as $\delta$-cyclodextrin and $\epsilon$-cyclodextrin as well as any derivatives of cyclodextrins. Other similar organic materials that may be utilized in cutting the nanotubes in alternative embodiments include, but are not limited to, the following: any material comprising at least one glucopyranose unit, any material comprising at least one monosaccharide unit, any material comprising at least one cyclic oligosaecharides, any material comprising at least one cyclic polysaccharide, any material comprising at least one linear oligosaccharides, any material comprising at least one branched oligosaccharides, any material comprising at least one linear polysaccharides, any material comprising at least one branched polysaccharides, and any derivatives of the aforementioned materials.

Figure 2A:
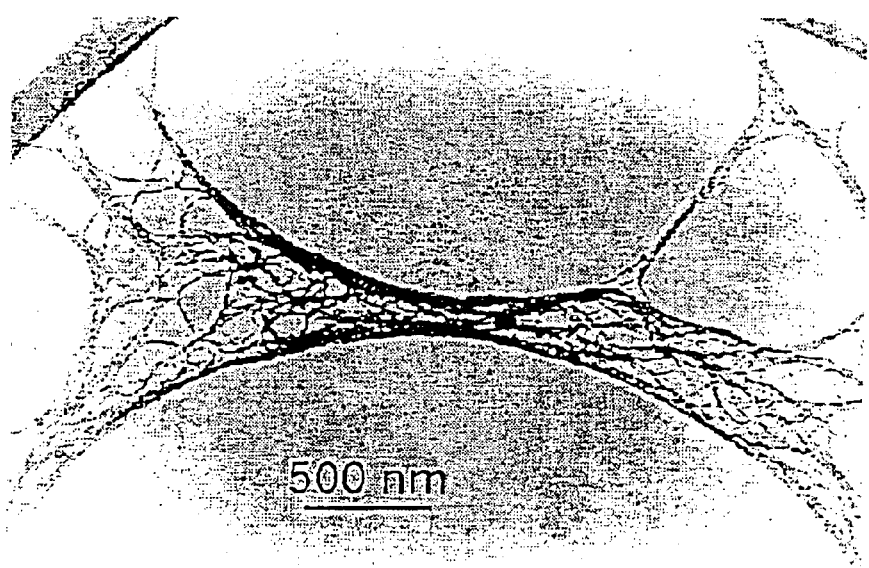
FIG. 2A shows a TEM image of as-prepared SWNTs produced by the HIPCO id process.
Figure 2B:
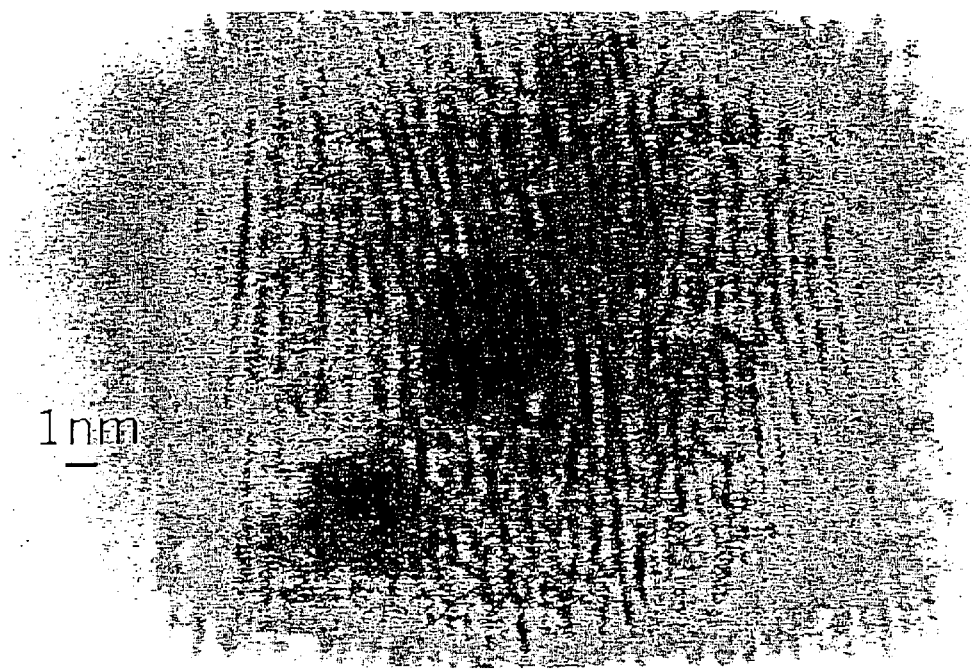
FIG. 2B shows a high-resolution TEM image of as-prepared SWNTs produced by HIPCO process.

Thus, a preferred embodiment provides a "soft" cutting technique utilizing cyclodextrins, such as α-, γ-, β-, δ, and/or ε-cyclodextrins. Other embodiments may utilize other soft organic materials, such as those identified above. A preferred embodiment of the present invention is suitable for cutting not only relatively small diameter nanotubes (e.g., having a diameter less than 1 nm), such as those produced by the gas-phase catalytic process (e.g., HIPCO), but is also suitable for cutting relatively large diameter nanotubes (e.g., nanotubes having a diameter greater than 1 nm). FIG. 2A is a TEM image of typical SWNTs, as produced by the above-described process. Such SWNTs typically comprise relatively long (e.g., >4 μm) and thick (e.g., 20–100 nm) nanotube ropes, mixed with a small amount of residual iron catalyst particles. A nanotube rope may comprise many entangled nanotubes. FIG. 2B is a high-resolution TEM image of SWNTs produced by the HIPCO process.

An example of a soft cutting procedure according to a preferred embodiment is described hereafter. In one exemplary cutting process of a preferred embodiment, 5.4 mg of SWNTs (produced by the HIPCO process) and 162 mg of γ-cyclodextrin was ground in 1 ml ethanol for 10 minutes (min) by using agate mortar and pestle. The resulting sticky, grayish mixture was further ground for 1 hour (without addition of ethanol) to give a homogeneous, fine black powder. The black powder was then ground for another 1.5 hours, and was then heated at 75°C. for 24 hours.

Figure 3A:
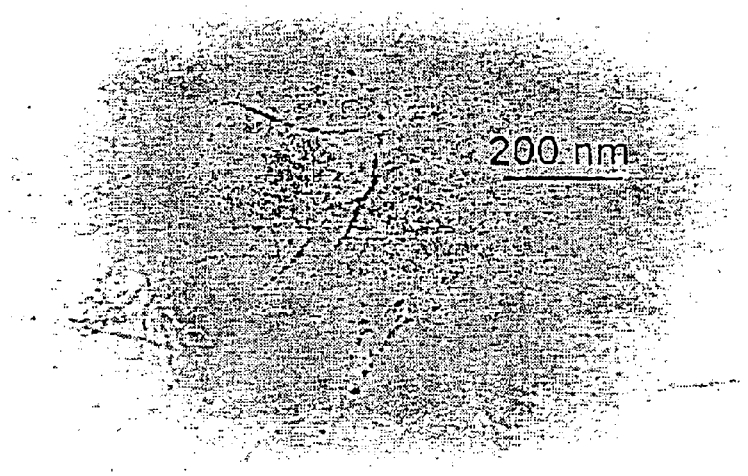
FIG. 3A shows a TEM image of shortened SWNTs obtained by a preferred embodiment of the present invention.
Figure 3B:
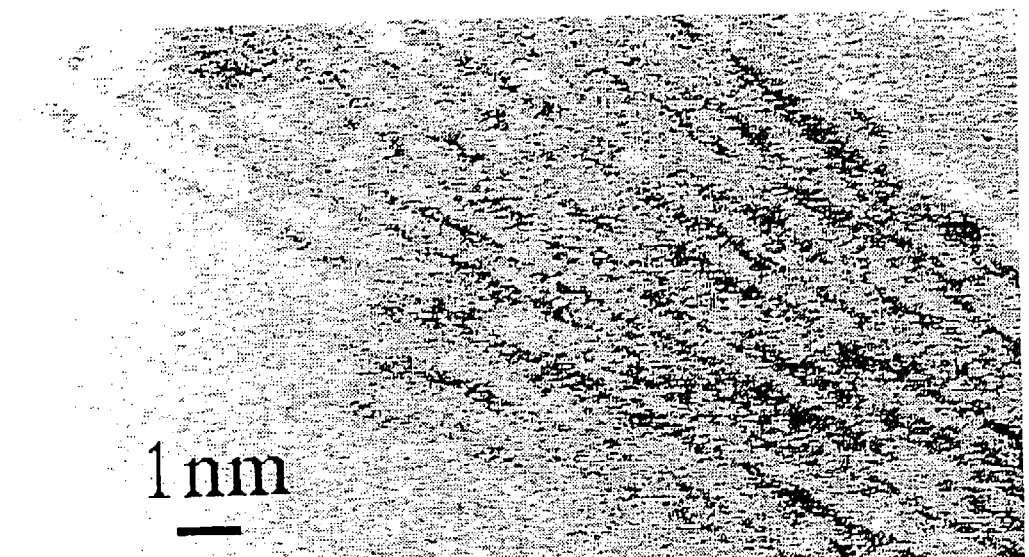
FIGS. 3B–3C each show a high-resolution TEM image of shortened SWNTs obtained by a preferred embodiment of the present invention.
Figure 3C:
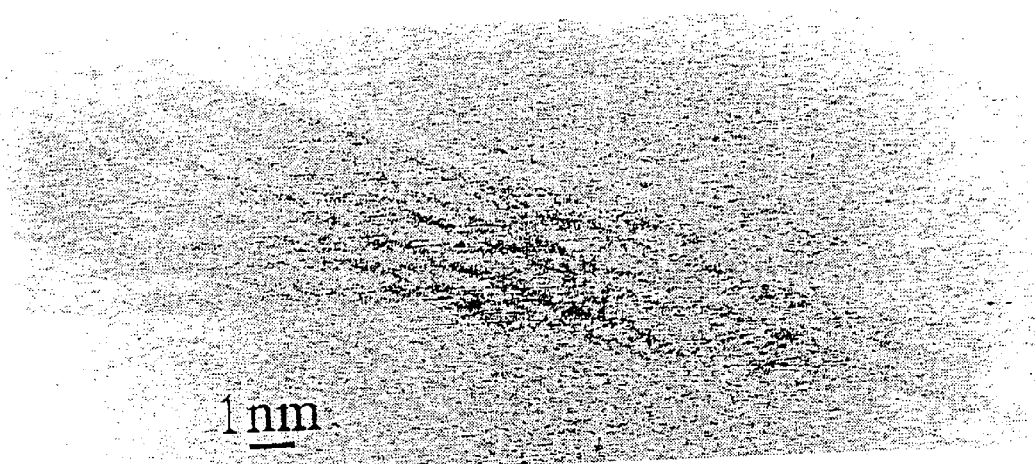

In contrast to the starting SWNT material, nearly all of the product (e.g., >95%) was easily dispersed in deionized water by approximately 10 minutes of sonication to form a quite "stable" colloidal suspension (0.2 mg SWNTs-γ-cyclodextrilnml) for at least 12 hours. About 90% of the resulting shortened nanotubes (after following the above exemplary procedure) had lengths less than 1 μm, and approximately 70% of which were thin ropes (5–10 nm) with lengths between 100–600 NM. FIG. 3A shows the TEM image of shortened SWNTs. FIGS. 3B and 3C show the high-resolufion TEM images of shortened SWNTs. Once the cutting (or grinding) process is complete, the γ-cyclodextrin can be readily removed, for example, by membrane filtration (0.2 μm pore size), followed by thorough washing with deionized water. The resulting black solid, which contains only shortened nanotubes without cyclodextrins, is much more difficult to disperse in water, and surfactant e.g., sodium dodecyl sulfate (SDS), may be utilized to get a stable aqueous suspension by sonication.

While the above exemplary process is described utilizing γ-cyclodextrin, it should be recognized that various other cyclodextrins or various other types of soft material may be utilized in the grinding process in addition to or instead of γ-cyclodextrin, and utilization of any such soft material is intended to be within the scope of the present invention. For example, it has been recognized through preliminary experimentation that grinding of SWNTs in β-cyclodextrin may provide similar results as those of γ-cyclodextrin. Thus, for instance, β-cyclodextrin may be used in place of γ-cyclodextrin in the above-described exemplary nanotube cutting process. Other cyclodexus and similar materials as described above may be utilized for cutting nanotubes in alternative embodiments. While the above exemplary process is described utilizing agate mortar and pestle, other grinding and milling techniques, such as ball milling, may be utilized for cutting nanotubes. While the above exemplary process produces mainly shortened nanotubes with lengths between 100–600 nm, the length distributions of shortened nanotubes can be readily adjusted by adjusting experimental parameters such as the weight ratio of cyclodextrins to nanotubes, grinding energy, temperature, grinding time, etc. Shortened nanotubes will have a rich chemistry due to their higher chemical processability, and they can be further sorted by length, chemically functionalized, solubilized and/or chromatographically purified.

While certain soft organic materials, such as cyclodextrins and certain other materials, such as those identified above, are effective for cutting nanotubes, not all soft organic materials are suitable for performing such cutting of nanotubes. As described further below, it is believed that cyclodextrins and certain other materials, such as those identified above, are effective for cutting nanotubes in the manner described above due, at least in part, to their ability to disperse the nanotubes. Various other soft organic materials do not provide such dispersion, and therefore may fail to suitably cut nanotubes in the manner described above with cyclodextrins and certain other materials. For example, the grinding of SWNTs in octadecyl amine (ODA), gives an inhomogeneous, grayish mixture of white (ODA) and black (SWNTs) fine particles, indicating that the SWNT solid is not well dispersed in ODA. The product is difficult to disperse in chloroform and terahydofuran and does not form a stable suspension by 10 min of sonication. TEM images of such experiments have shown that the product comprises mostly full-length SWNTs. Also, the grinding of SWNTs in Sodium dodecyl sulfate (SDS) gives similar results as those of ODA.

Figure 4:
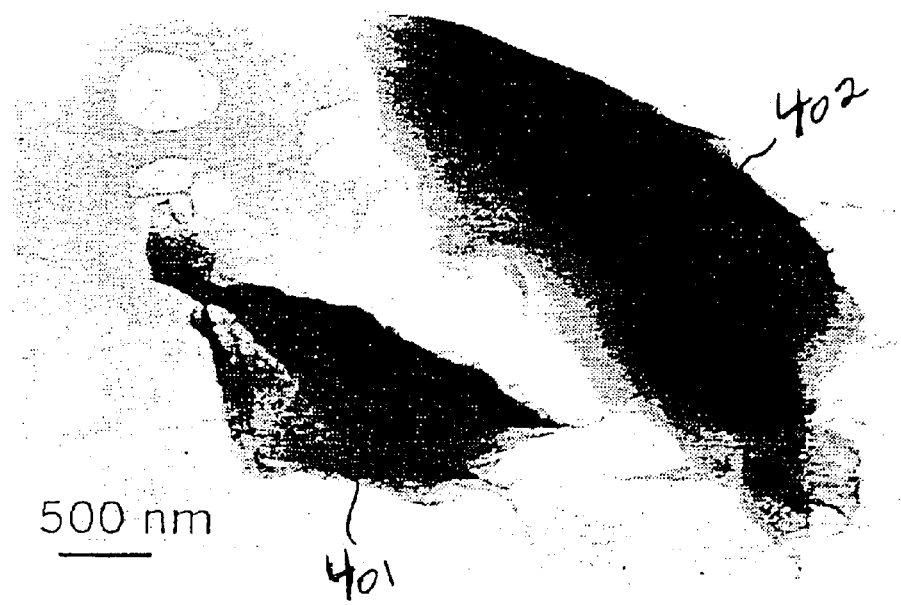
FIG. 4 shows a TEM image of resulting high-density material obtained by grinding nanotubes without addition of chemical material thereto.

Further, the inclusion of a dispersing material, such as cyclodextrins or the other materials identified above, in the grinding process enhances the nanotube cutting process. For example, the grinding of SWNTs without the addition of any chemicals results in black particles with much higher density, examples of which are shown as high-density particles 401 and 402 in the TEM image of FIG. 4. The resulting high-density material is extremely difficult to disperse in either water or organic solvents. It is believed that the nanotubes of a rope compress together during the grinding process if a suitable chemical material is not included with the nanotubes during such grinding process, thus resulting in a high-density material such as that shown in the TEM image of FIG. 4. For example, it is believed that certain materials, such as cyclodextrins, encourage dispersion of the nanotubes during the grinding process, which promotes cutting of the nanotubes rather than such nanotubes compressing together during the grinding process to form a high-density material.

In view of the above, cyclodextrins and certain other materials, such as those identified above, have surprisingly superior solid-state nanotube dispersing capability. That is, cyclodextrins act as excellent solid-state nanotube dispersing reagents. Any soft, organic materials that exhibit such solid-state nanotube dispersing capability are intended to be within the scope of the present invention and may be utilized for manipulating (e.g., dispersing) nanotubes in accordance with certain embodiments of the present invention.

According to certain implementations, a nanotube dispersing reagent, such as cyclodextrins and/or similar materials, such as those identified above, can be utilized for dispersing the nanotubes in appropriate solvents, regardless of whether cutting of the nanotubes is performed. For example, cyclodextrins and similar compounds may engage the appropriate diameter nanotubes to form novel rotaxane structures. Noncovalent functionalization of nanotubes by macrocyclic hosts (e.g., cyclodextrins and cyclic oligosaccharides) will lead to the dissolution of nanotubes in various solvents, such as organic and inorganic solvents. More specifically, an example of an inorganic solvent that may be utilized in a preferred embodiment is water. Examples of organic solvents that may be utilized in certain embodiments of the present invention include, but are not limited to, the following: acetic acid; acetone; acetonitrile; aniline; benzene; benzonitrile; benzyl alcohol; bromobenzene; bromoform; 1-butanol; 2-butanol; carbon disulfide; carbon tetrachloride; chlorobenzene; chloroform; cyclohexane; cyclohexanol; decalin; dibromethane; diethylene glycol; diethylene glycol ethers; diethyl ether, diglyme; dimethoxymethane; N,N-dimethylformamide; ethanol; ethylamine; ethylbenzene; ethylene glycol ethers; ethylene glycol; ethylene oxide; formaldehyde; formic acid; glycerol; heptane; hexane; iodobenzene; mesitylene; methanol; methoxybenzene; methylamine; methylene bromide; methylene chloride; methylpyridine; morpholine; naphthalene; nitrobenzene; nitromethane; octane; pentane; pentyl alcohol; phenol; 1-propanol; 2-propanol; pyridine; pyrrole; pyrrolidine; quinoline; 1,1,2,2-tetrachloroethane; tetrachloroethylene; tetrahydrofuran; tetaahydropyran; tetralin; tetramethylethylenediamine; thiophene; toluene; 1,2,4-trichlorobenzene; 1,1,1-trichloroethane; 1,1,2-trichloroethane; trichloroethylene; triethylamine; triethylene glycol dimethyl ether; 1,3,5-trimethylbenzene; m-xylene; o-xylene; p-xylene; 1,2-dichlorobenzene; 1,3-dichlorobenzene; and 1,4-dichlorobenzene. The noncovalent functionalization of nanotubes by macrocyclic hosts may allow for the separation of nanotubes by diameter, for example, by varying the size of macrocyclic hosts. Further functionalization of macrocyclic hosts may produce various inorganic and organic chemical "handles" on carbon nanotubes and construction of 1-dimensional, 2-dimensional and 3-dimensional assembly of SWNTs, a key to building nanotube devices.

Accordingly, one embodiment of the present invention enables functionalization of nanotubes. For instance, an organic material (e.g., cyclodextrin) may be presented to a plurality of nanotubes, and the organic material may selectively noncovalently functionalize at least one of the plurality of nanotubes based at least in part on nanotube diameter size. That is, the organic material utilized may noncovalently functionalize certain nanotubes of a particular diameter size (or within a particular range of diameter sizes). More specifically, in noncovalently functionalizing the nanotubes, the organic material may engage such nanotubes (e.g., may selectively engage those nanotubes having a particular diameter size). Thereafter, the nanotubes may be separated based on diameter size of the organic material that engages each nanotube. That is, nanotubes may be separated into different groups based on the diameter size of the organic material that engages such nanotube, which may allow for easy sorting of nanotubes, for instance. In one embodiment, the noncovalently functionalizing of a nanotube by an organic material forms at least one rotaxane complex. Further, in one embodiment, the noncovalently functionalizing of a nanotube by an organic material enables dissolution of such nanotube in a solvent, such as the solvents identified above.

Figure 5A:
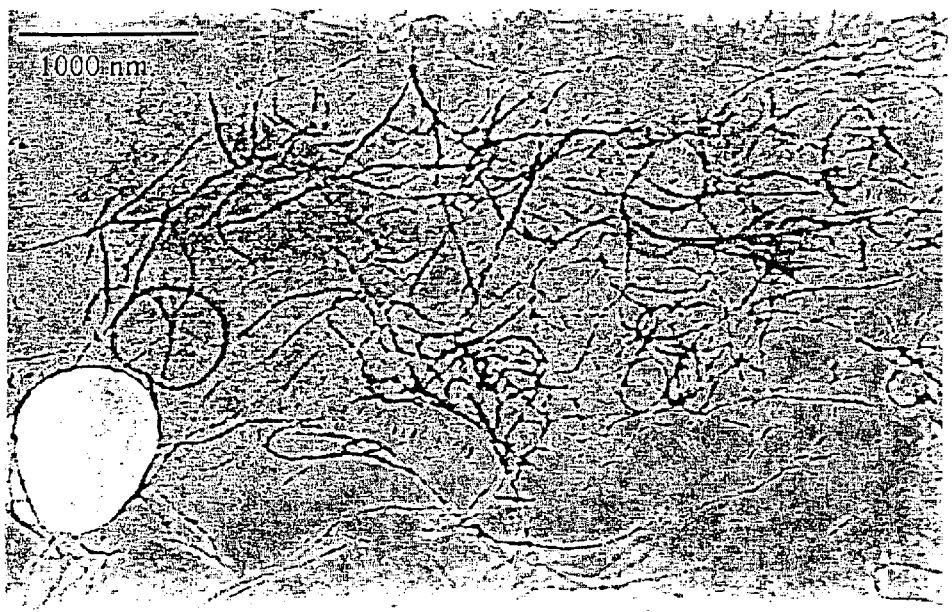
FIGS. 5A–5B show the TEM images of SWNTs dispersed by γcyclodextrin and sonication in water. a) 10 minutes of sonication; b) 30 minutes of sonication.
Figure 5B:
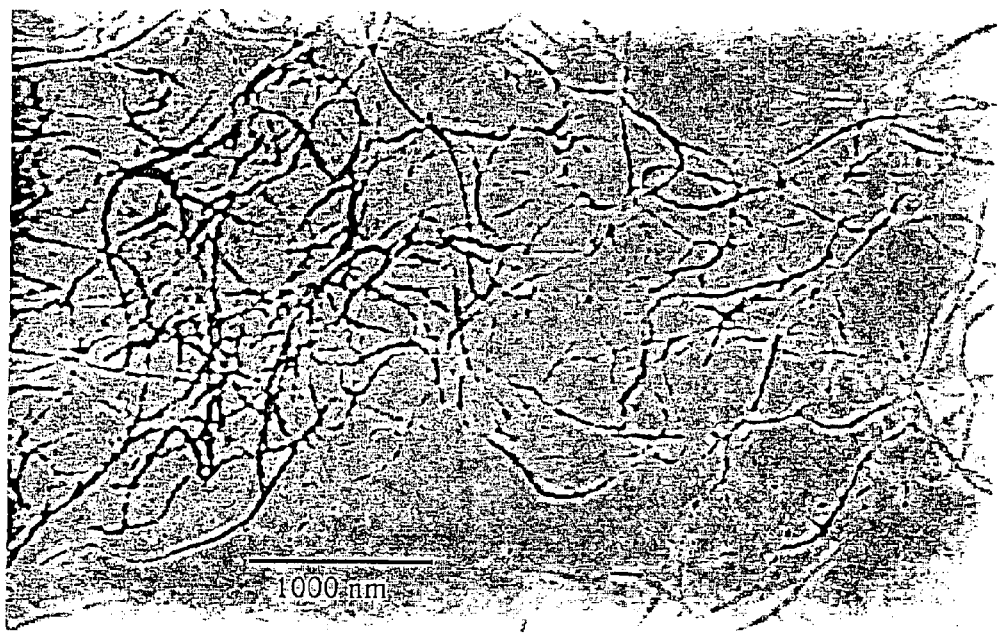

An exemplary process of one embodiment of the present invention is described hereafter, which utilizes cyclodextrins for performing dispersion of nanotubes in water. According to such process, a mixture of SWNTs (e.g., produced by the HIPCO process) and γ-cyclodextrin (weight ratio 1:30) in deionized water (0.2 mg SWNTs-γ-cyclodextrin/ml water) in a plastic container was sonicated under the same condition for a) 10 min and b) 30 min separately, which gave rise to quite stable suspensions. According to TEM images obtained through experimentation (provided as FIGS. 5A and 5B), in each case, over 90% of the SWNTs ropes have lengths greater than 1 μm, usually several micrometers long. This is because no grinding/cutting has been performed, but rather only dispersion. Also, compared to the as-prepared SWNTs (e.g., such as those shown in FIGS. 2A and 2B, the average diameters of the nanotube ropes are reduced due to good dispersion of the nanotubes by the cyclodextrins in water. As described above, certain other compounds may be used instead of or in addition to cyclodextrins, such as the exemplary compounds identified above, which may exhibit the above-described nanotube dispersion capability.

It is believed that the excellent dispersion of SWNT ropes in organic matrix is at least one key to the success of the above-described exemplary cutting process of a preferred embodiment. Otherwise, without proper dispersion of the nanotubes, the flexible nanotube ropes tend to be entangled and compressed together during the grinding to form high-density particles (such as those shown in FIG. 4). Once the nanotube material is well dispersed (e.g., by exposure to cyclodextrin), and the thick nanotube ropes are partially exfoliated into thin nanotube robes, the normal grinding force appears to be strong enough to induce local conformational strains on nanotubes, which eventually lead to the cutting of nanotube ropes, most probably at their defective sites.

As described above, in certain embodiments of the present invention, nanotubes may be dispersed responsive to exposure to a dispersing reagent, irrespective of whether the nanotubes are to be cut into shortened tubes. For instance, without grinding the nanotubes, the aqueous dispersion of SWNTs may be obtained by sonication with γ-cyclodextrin in deionized water, which gives essentially full-length SWNTs (>90%).

Figure 6:
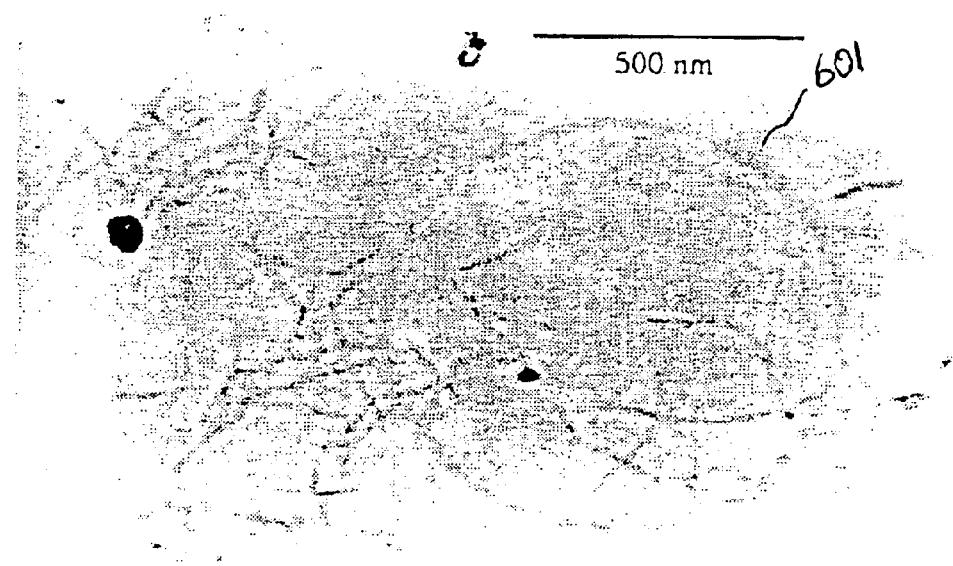
FIG. 6 shows a TEM image of arc-grown SWNTs shortened by a preferred embodiment of the present invention.
Figure 1:
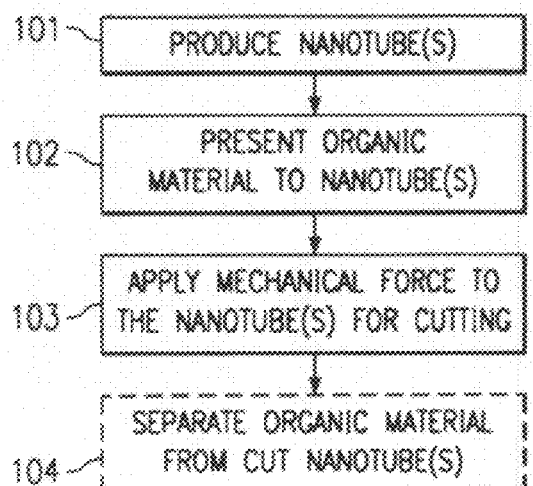
Figure 2A:
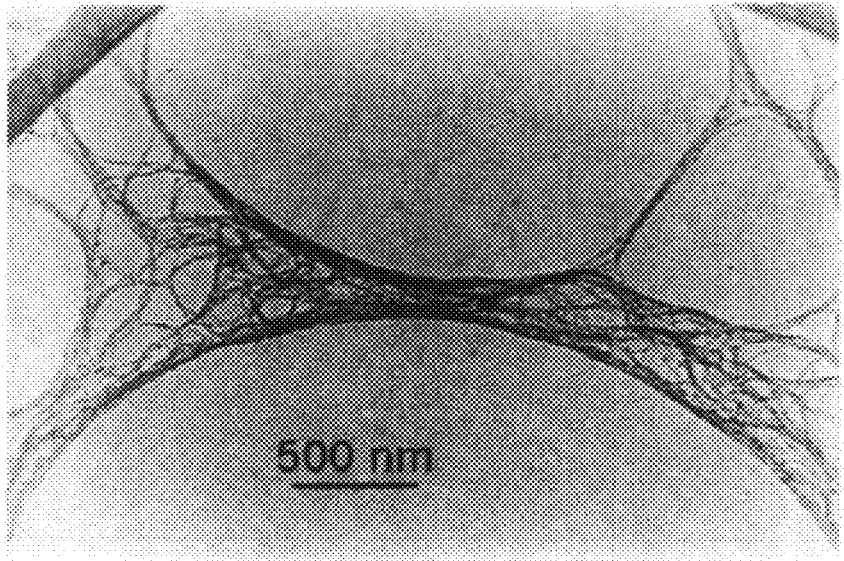
Figure 2B:
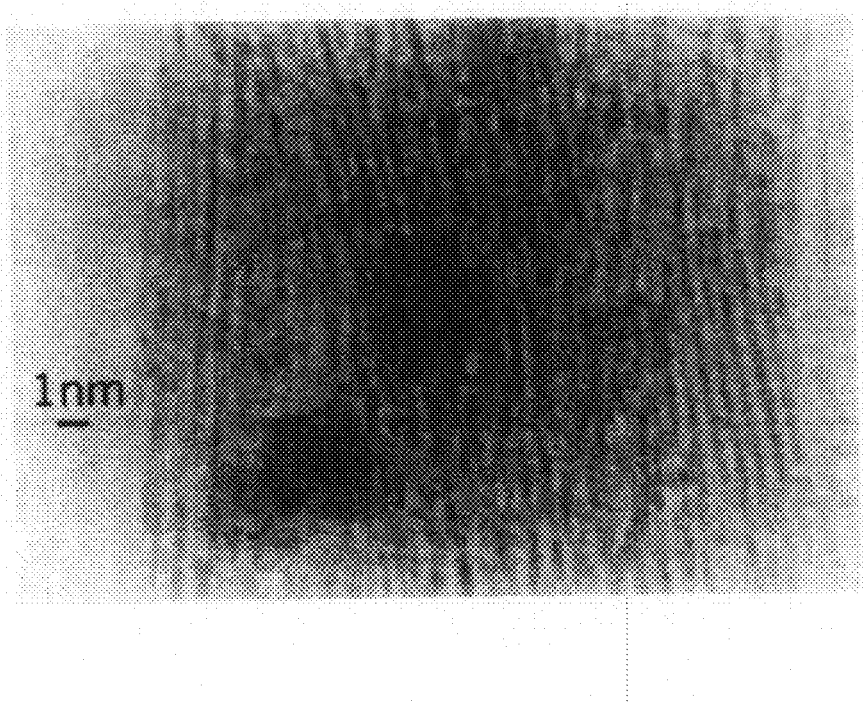
Figure 3A:
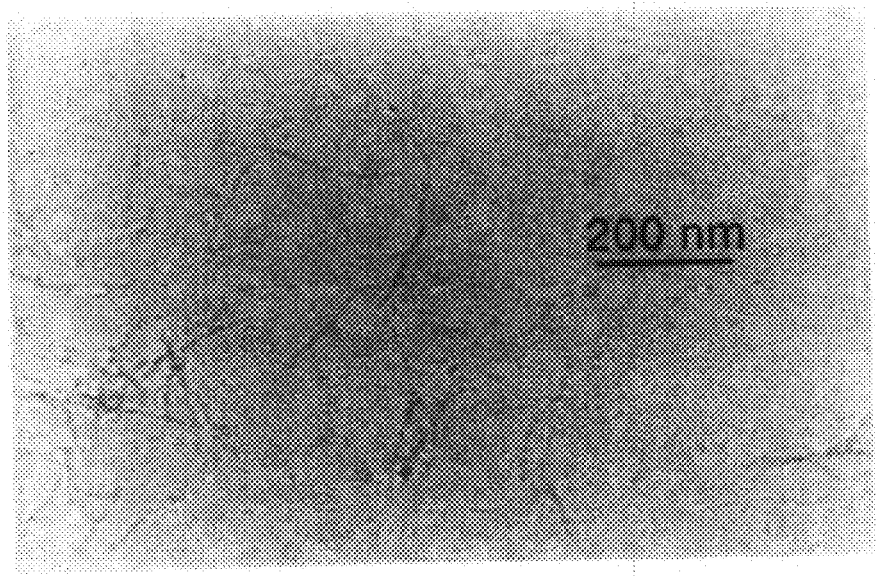
Figure 3B:
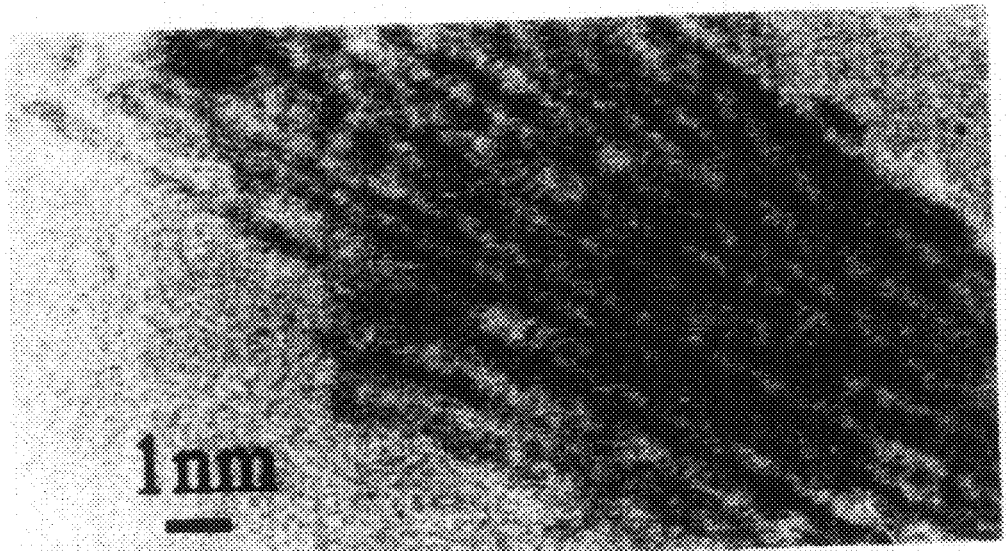
Figure 3C:
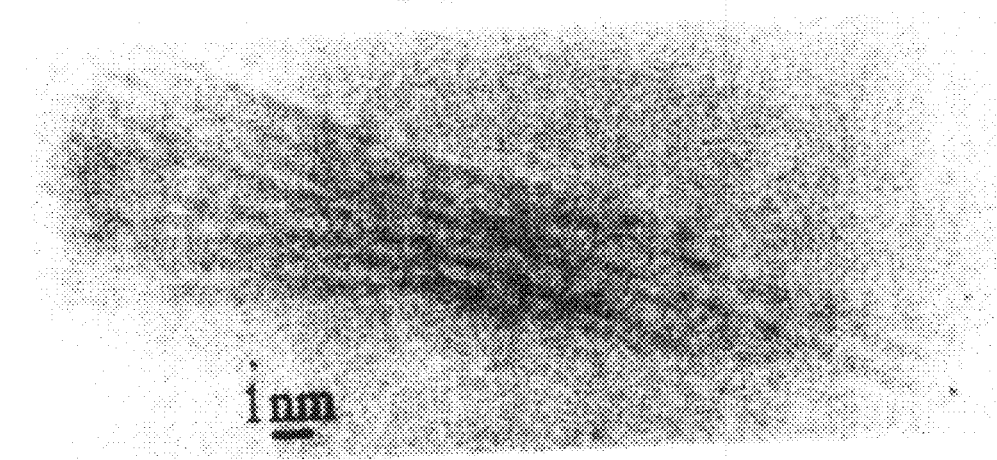
Figure 4:
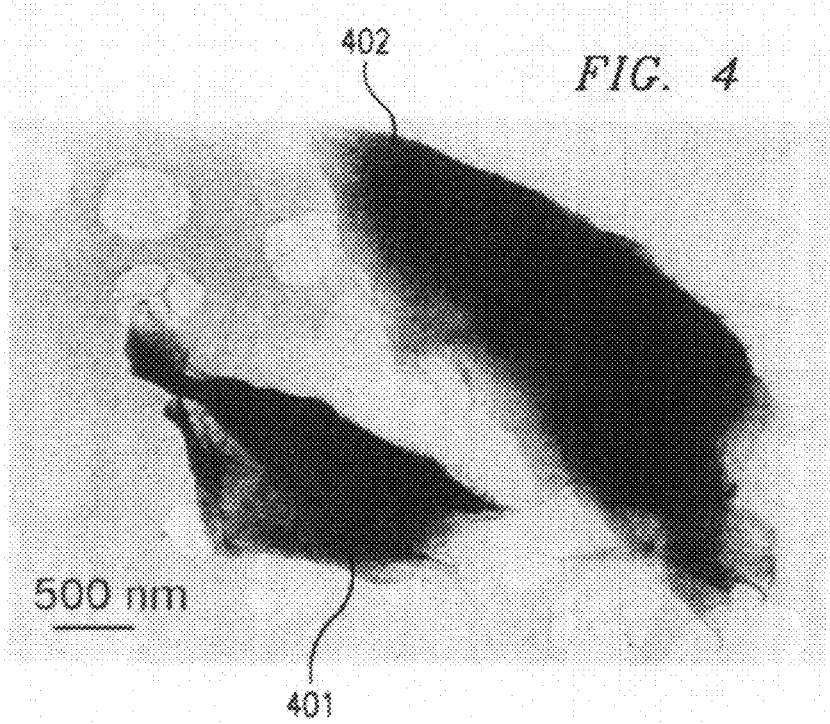
Figure 5A:
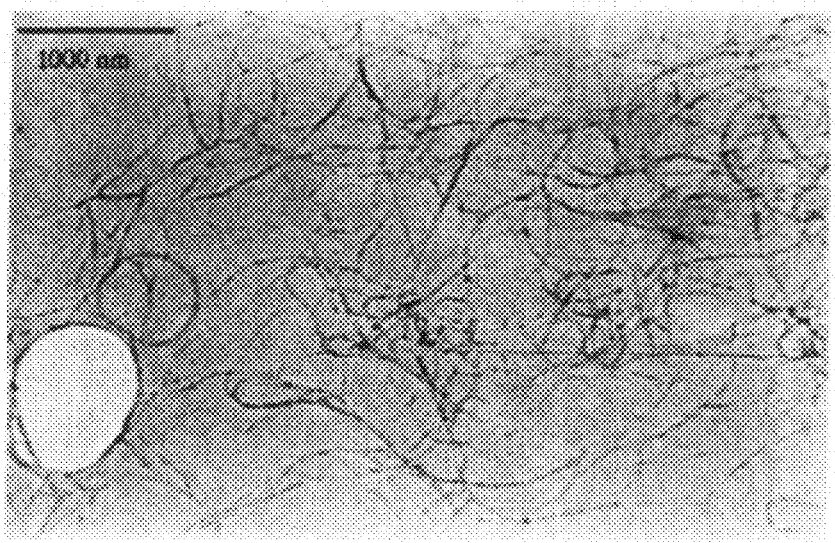
Figure 5B:
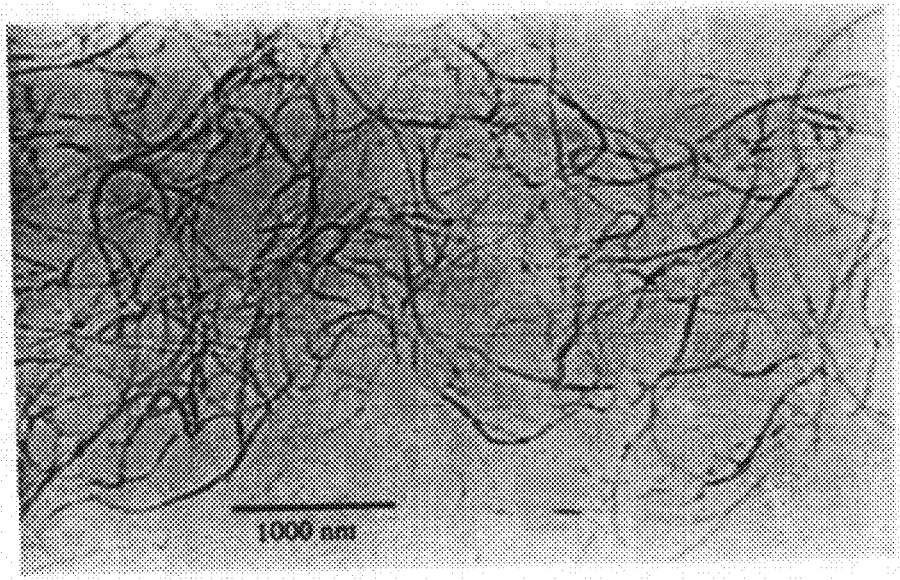
Figure 6:
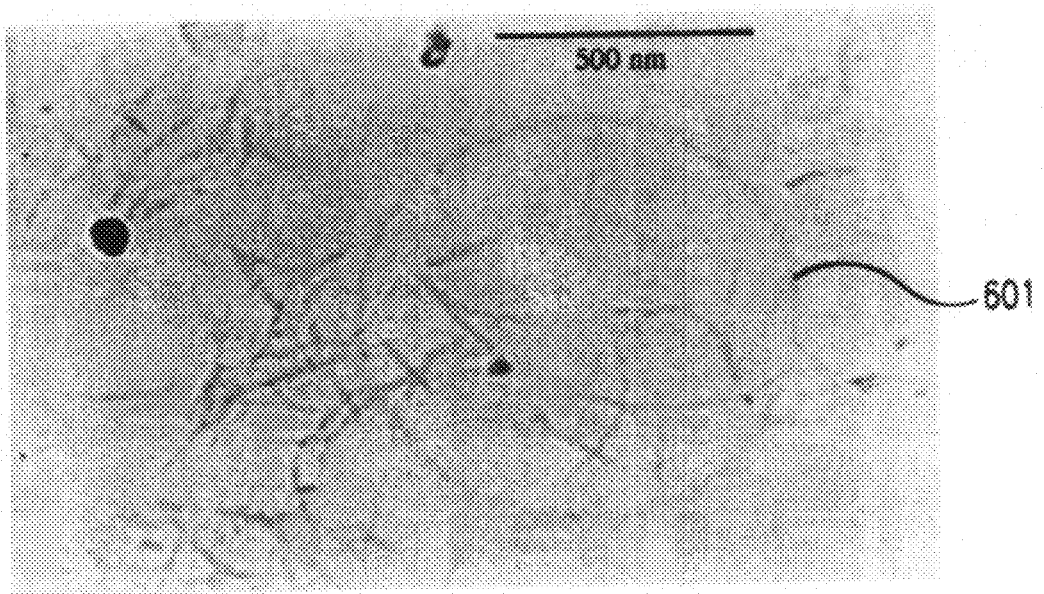

While the above examples describe a preferred embodiment for cutting nanotubes produced by a gas-phase catalytic process (e.g., HIPCO process), it should be understood that embodiments of the present invention may be utilized for shortening the length of nanotubes produced by any process now known or later discovered. For example, embodiments of the present invention may be utilized for cutting nanotubes produced through a laser vaporization technique. As another example, embodiments of the present invention may be utilized for cutting electric arc-grown nanotubes. For instance, purified electric arc-grown SWNTs may be cut by utilizing the exemplary process described hereafter. According to such exemplary process for cutting electric arc-grown SWNTs, we have conducted experiments in which 1.1 mg of bucky paper (available from Carbolex, Inc.) and 66 mg γ-cyclodextrin was ground in 1 ml ethanol for 15 min. The resulting mixture was further ground for 2 hours (without addition of ethanol) to give a homogeneous, fine dark-grayish powder. The powder was heated at 75° C. for 24 hours, and was then ground for another 30 min. The aqueous suspension (0.2 mg SWNTs-γ-cyclodextrin/ml) was typically stable for less than 20 min, possibly due to the larger diameter of arc-grown SWNTs. The yield of the resulting shortened SWNTs (100 nm to 1 μm) is estimated by TEM images obtained during experimentation to be over 80%. FIG. 6 provides an exemplary TEM image of resulting shortened arc-grown SWNTs. Note that circle 601 in the image results from the Holey Cabon TEM grid.

In view of the above, various embodiments of the present invention allow for dispersion and/or cutting of nanotubes. According to one embodiment of the present invention, a soft organic material is utilized for cutting nanotubes. According to another embodiment of the present invention, a soluble organic material is utilized for cutting nanotubes. According to yet another embodiment of the present invention, a soft organic material that is soluble is utilized for cutting nanotubes. According to still another embodiment, a material that acts as a dispersing reagent for dispersing nanotubes of a nanotube rope is utilized for dispersing and/or cutting such nanotubes. In a preferred embodiment, the material utilized for cutting nanotubes comprises cyclodextrin. However, other suitable chemical materials, such as the exemplary compounds identified hereinabove, may be utilized in other embodiments of the present invention.

A preferred application of the present invention is utilized to disperse and/or cut carbon nanotubes. However, embodiments of the present invention may be utilized for dispersing and/or cutting other types of nanotubes. Additionally, a preferred application of the present invention is utilized to disperse and/or cut carbon nanotubes that have relatively small diameters, such as those produced by the above-described gas-phase process. However, embodiments of the present invention may be utilized for dispersing and/or cutting nanotubes produced by any suitable process now known or later discovered, including without limitation a laser vaporization process and an electric arc process.

Also, it should be noted that the term "nano" typically refers to a unit of measure of $10^{-9}$ in scientific notation and a nanometer is $10^{-9}$ meters. However, in the description and claims herein the term "nano" refers to structures that are very small and would typically be thought of and measured in the nanometer range. The term is meant to cover structures with at least one dimension between 0.4 nm and 1000 nm. The preferred range for the process described herein is nanotube diameters between 0.4 nm and 400 nm, and nanotube lengths between 1 nm and 1 millimeter (mm).

Shortened SWNTs will likely find applications in many technological fields. Three major fields in which it is anticipated shortened SWNTs will likely find application are identified hereafter, and many other fields may also find use for shortened SWNTs. One major field in which shortened SWNTs will likely find application is the field of nanostructured composites and copolymers. Processable shortened SWNTs can be further polymerized and copolymerized to form nanotube-based polymer composites and copolymers which may find applications in the areas of electromagnetic shielding coatings for military aircraft and ships, as well as cellular telephones and laptops, antistatic coatings (e.g., for automobiles), and organic thin film devices for microelectronics and micro-optoelectronics. Another major field in which shortened SWNTs will likely find application is the field of functional nanostructures. Shortened SWNTs (e.g., having length <1 μm) are expected to have a rich chemistry due to their higher chemical processability (for example, they can be further sorted by length, chemically functionalized, solubilized and chromatographically purified), and they are the fitting subject of a new branch of organic chemistry, a molecular nanotechnology of great promise. Applications could include (but not be limited to): semiconductors for transistors, resonant tunneling diodes, memory elements, metallic interconnects, electromechanical devices, chemical-electrical-mechanical devices, antenna arrays, atomic force microscope (AFM) tips, scanning tunnelling microscope (STM) tips, chemical sensors, and nanolithography. A third major field in which shortened SWNTs will likely find application is the field of energy storage systems. For example, shortened SWNT materials, due to their high densities of open ends, may find applications in electrochemical energy storage systems for lithium batteries and hydrogen storage systems for fuel cells.

It should be understood that while specific exemplary processes are described above for dispersing and/or cutting nanotubes (e.g., utilizing γ-cyclodextrin), the scope of the present invention is not intended to be limited solely to such exemplary processes. Rather, such processes are intended solely as examples that render the disclosure enabling for various other processes for dispersing and/or cutting nanotubes. Thus, for example, the ratio of cyclodextrin (or other suitable material) to nanotubes, grinding time, heating temperature/time, and various other steps in the above-described exemplary processes may be varied. For instance, the grinding time may be increased, which may result in further shortening of the average length of the resulting shortened nanotubes. Also, other grinding and milling techniques, such as ball milling (e.g., planetary ball milling) can be utilized to cut the nanotubes in soft organic materials.

Certain embodiments of the present invention provide a solid-state dispersing/cutting process for nanotubes that successfully avoids not only sonication in strong acids and oxidants which can severely damage relatively small diameter nanotubes (such as those produced with the above-described gas-phase catalytic reaction process), but also long-time sonication in any solvent which could make scaling-up difficult. Also, in certain embodiments of the present invention, a grinding mechanism, such as a mortar and pestle, may be utilized for grinding the nanotubes for cutting. Larger-scale production of shortened nanotubes may be achieved through utilizing an appropriate grinding mechanism, such as a ball mill (also known as a centrifugal or planetary mill), which is a device commonly used to rapidly grind materials to colloidal fineness by developing high grinding energy via centrifugal and/or planetary action. Any suitable mechanism now known or later developed for grinding nanotubes are intended to be within the scope of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

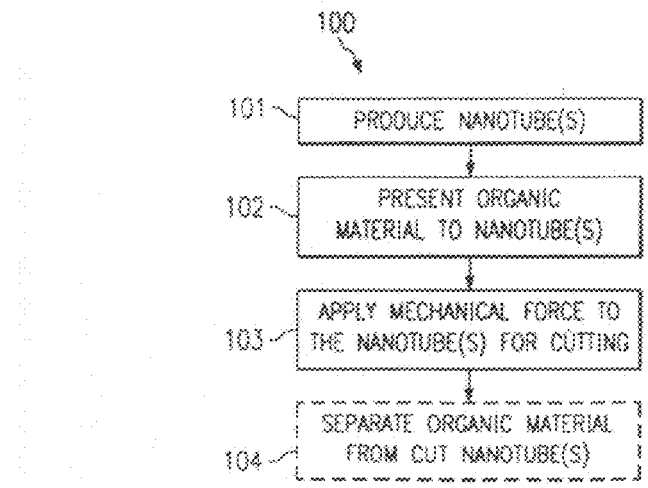

What is claimed is:

1. Method for cutting nanotubes comprising:
   exposing at least one nanotube having a first length to a soft organic material; and
   grinding said at least one nanotube with said soft organic material to result in at least one shortened nanotube having a length that is shorter than said first length.

2. The method of claim 1 wherein said soft organic material comprises cyclodextrin.

3. The method of claim 2 wherein said cyclodextrin comprises at least one selected from the group consisting of:
   γ-cyclodextrin, α-cyclodextrin, β-cyclodextrin, δ-cyclodextrin, ε-cyclodextrin, and any derivative of at least one of the aforementioned cyclodextrins.

4. The method of claim 1 wherein said soft organic material comprises at least one selected from the group consisting of: at least one glucopyrane, at least one monosaccharide, at least one cyclic oligosaccharide, at least one linear oligosaccharide, at least one branched oligosaccharide, at least one cyclic polysaccharide, at least one linear polysaccharide, and at least one branched polysaccharide.

5. The method of claim 1 wherein said soft organic material is soluble in at least one of an organic solvent and an inorganic solvent.

6. The method of claim 5 further comprising: solubilizing said soft organic material to separate said at least one shortened nanotube from said soft organic material.

7. The method of claim 1 wherein said soft organic material is a dispersing reagent capable of dispersing a plurality of solid-state nanotubes.

8. The method of claim 1 wherein said first length is the length of said at least one nanotube as produced.

9. The method of claim 1 wherein said first length is at least 1 micrometer ($\mu$m).

10. The method of claim 1 wherein said first length is less than 1 micrometer ($\mu$m).

11. The method of claim 1 wherein said at least one nanotube comprises at least one selected from the group consisting of:
    carbon nanotube, single-walled nanotube, multi-walled nanotube, and boron nitride nanotube.

12. A system for cutting nanotubes comprising:
    at least one nanotube having a first length;
    soft organic material; and
    grinding mechanism operable to apply force against said at least one nanotube and said soft organic material to cut said at least one nanotube to produce at least two nanotubes each having a length shorter than said first length.

13. The system of claim 12 wherein said soft organic material comprises cyclodextrin.

14. The system of claim 13 wherein said cyclodextrin is at least one selected from the group consisting of: $\gamma$-cyclodextrin, $\alpha$-cyclodextrin, $\beta$-cyclodextrin, $\delta$-cyclodextrin, $\epsilon$-cyclodextrin, and any derivative of at least one of the aforementioned cyclodextrins.

15. The system of claim 12 wherein said soft organic material comprises at least one selected from the group consisting of: at least one glucopyranose, at least one monosaccharide, at least one cyclic oligosaccharide, at least one linear oligosaccharide, at least one branched oligosaccharide, at least one cyclic polysaccharide, at least one linear polysaccharide, at least one branched polysaccharide, and any derivative of the aforementioned.

16. The system of claim 12 wherein said grinding mechanism comprises a mortar and pestle.

17. The system of claim 12 wherein said grinding mechanism comprises a planetary ball mill.

18. The system of claim 12 further comprising a plurality of nanotubes.

19. The system of claim 18 wherein said soft organic material comprises a dispersing reagent capable of dispersing at least a portion of said plurality of nanotubes when said plurality of nanotubes are in solid-state form.

20. The system of claim 12 herein said soft organic material is soluble in at least one of an organic solvent and an inorganic solvent.

21. The system of claim 12 wherein said at least one nanotube comprises at least one carbon nanotube.

22. A system for cutting nanotubes comprising:
    a plurality of nanotubes, at least one of said plurality of nanotubes having a first length;
    dispersing reagent comprising a soft organic material for dispersing at least a portion of said plurality of nanotubes; and
    grinding mechanism operable to apply force against said at least one of said plurality of nanotubes to cut said at least one nanotube to produce at least two nanotubes each having a length shorter than said first length.

23. The system of claim 22 wherein said dispersing reagent comprises cyclodextrin.

24. The system of claim 23 wherein said cyclodextrin is at least one selected from the group consisting of: $\gamma$-cyclodextrin, $\alpha$-cyclodextrin, $\beta$-cyclodextrin, $\delta$-cyclodextrin, $\epsilon$-cyclodextrin, and any derivative of at least one of the aforementioned cyclodextrins.

25. The system of claim 22 wherein said dispersing reagent comprises at least one selected from the group consisting of: at least one glucopyranose, at least one monosaccharide, at least one cyclic oligosaccharide, at least one linear oligosaccharide, at least one branched oligosaccharide, at least one cyclic polysaccharide, at least one linear polysaccharide, at least one branched polysaccharide, and any derivative of the aforementioned.

26. The system of claim 22 wherein said grinding mechanism comprises a mortar and pestle.

27. The system of claim 22 wherein said grinding mechanism comprises a planetary mill.

28. The system of claim 22 wherein said dispersing reagent is soluble in at least one of an organic solvent and an inorganic solvent.

29. The system of claim 22 wherein said plurality of nanotubes comprise at least one carbon nanotube.

30. Method for cutting nanotubes comprising:
    exposing at least one nanotube having a first length to a soluble solid organic material, said soluble solid organic material being soluble in at least one of an organic solvent and an inorganic solvent; and
    using said soluble solid organic material to grind said at least one nanotube to result in at least one shortened nanotube having a length that is shorter than said first length.

31. The method of claim 30 wherein said soluble solid organic material comprises cyclodextrin.

32. The method of claim 31 wherein said cyclodextrin comprises at least one selected from the group consisting of: $\gamma$-cyclodextrin, $\alpha$-cyclodextrin, $\beta$-cyclodextrin, $\delta$-cyclodextrin, $\epsilon$-cyclodextrin, and any derivative of at least one of the aforementioned cyclodextrins.

33. The method of claim 30 wherein said soluble solid organic material comprises at least one selected from the group consisting of: at least one glucopyranose, at least one monosaccharide, at least one cyclic oligosaccharide, at least one linear oligosaccharide, at least one branched oligosaccharide, at least one cyclic polysaccharide, at least one linear polysaccharide, at least one branched polysaccharide, and any derivative of the aforementioned.

34. The method of claim 30 wherein said soluble solid organic material is soft.

35. The method of claim 30 wherein said soluble solid organic material is a dispersing reagent capable of dispersing a plurality of solid-state nanotubes.

36. The method of claim 30 wherein said first length is the length of said at least one nanotube as produced.

37. The method of claim 30 wherein said first length is at least 1 micrometer ($\mu$m).

38. The method of claim 30 further comprising: solubilizing said soluble organic material to separate said at least one shortened nanotube from said soluble organic material.

39. The method of claim 30 wherein said at least one nanotube comprises at least one selected from the group consisting of: carbon nanotube, single-walled carbon nanotube, multi-walled carbon nanotube, and boron nitride nanotube.

40. Method for cutting nanotubes comprising: presenting cyclodextrin to at least one nanotube; and applying a force against at least said at least one nanotube to cut said at least one nanotube.

41. The method of claim 40 wherein said applying a force comprises:

grinding said at least one nanotube with said cyclodextrin.

42. The method of claim 40 wherein said presenting step comprises presenting said cyclodextrin to a plurality of nanotubes, and said method further comprises said dispersing at least a portion of said plurality of nanotubes with said cyclodextrin.

43. The method of claim 40 wherein said cyclodextrin comprises at least one selected from the group consisting of: γ-cyclodextrin, α-cyclodextrin, β-cyclodextrin, δ-cyclodextrin, ε-cyclodextrin, and any derivative of at least one of the aforementioned cyclodextrins.

44. The method of claim 40 wherein said at least one nanotube comprises at least one selected from the group consisting of: carbon nanotube, single-walled nanotube, multi-walled nanotube, and boron nitride nanotube.

45. The method of claim 40 wherein said at least one nanotube has a diameter of at least 0.4 nm.

46. The method of claim 40 wherein said at least one nanotube has a diameter that is less than 1 nm.

47. The method of claim 46 wherein said at least one nanotube has a diameter within the range of approximately 0.4 to approximately 400 nm.

48. Method for cutting nanotubes comprising: exposing at least one nanotube having a first length to a solid-state nanotube dispersing reagent; and applying a force against said at least one nanotube to result in at least one shortened nanotube having a length that is shorter than said first length.

49. The method of claim 48 wherein said dispersing reagent comprises cyclodextrin.

50. The method of claim 49 wherein said cyclodextrin comprises at least one selected from the group consisting of: γ-cyclodextrin, α-cyclodextrin, β-cyclodextrin, δ-cyclodextrin, ε-cyclodextrin, and any derivative of at least one of the aforementioned cyclodextrins.

51. The method of claim 48 wherein said dispersing reagent comprises at least one selected from the group consisting of: at least one glucopyranose, at least one monosaccharide, at least one cyclic oligosaccharide, at least one linear oligosaccharide, at least one branched oligosaccharide, at least one cyclic polysaccharide, at least one linear polysaccharide, at least one branched polysaccharide, and any derivative of the aforementioned.

52. The method of claim 48 wherein said dispersing reagent is soluble in at least one of an organic solvent and an inorganic solvent.

53. The method of claim 48 wherein said grinding step further comprises:

grinding said at least one nanotube with said solid-state nanotube dispersing reagent.

54. The method of claim 53 wherein said dispersing reagent is soluble, and further comprising:

solubilizing said dispersing reagent with at least one of an organic solvent and an inorganic solvent to separate said at least one shortened nanotube from said dispersing reagent.

55. The method of claim 48 wherein said first length is the length of said at least one nanotube as produced.

56. The method of claim 55 wherein said at least one nanotube is produced by a technique selected from the group consisting of: a gas-phase catalytic reaction process, an electric arc process, and a laser vaporization process.

57. The method of claim 48 wherein said first length is at least 1 micrometer ($\mu$m).

58. The method of claim 48 wherein said at least one nanotube comprises at least one carbon nanotube.

59. The method of claim 5 wherein said soft organic material is soluble in at least one organic solvent.

60. The method of claim 59 wherein said at least one organic solvent comprises at least one solvent selected from the group consisting of: acetic acid; acetone; acetonitrile; aniline; benzene; benzonitrile; benzyl alcohol; bromobenzene; bromoform; 1-butanol; 2-butanol; carbon disulfide; carbon tetrachloride; chlorobenzene; chloroform; cyclohexane; cyclohexanol; decalin; dibromethane; diethylene glycol; diethylene glycol ethers; diethyl ether; diglyme; dimethoxymethane; N,N-dimethylformamide; ethanol; ethylamine; ethylbenzene; ethylene glycol ethers; ethylene glycol; ethylene oxide; formaldehyde; formic acid; glycerol; heptane; hexane; iodobenzene; mesitylene; methanol; methoxybenzene; methylamine; methylene bromide; methylene chloride; methylpyridine; morpholine; naphthalene; nitrobenzene; nitromethane; octane; pentane; pentyl alcohol; phenol; 1-propanol; 2-propanol; pyridine; pyrrole; pyrrolidine; quinoline; 1,1,2,2-tetrachloroethane; tetrachloroethylene; tetrahydrofuran; tetrahydropyran; tetralin; tetramethylethylenediamine; thiophene; toluene; 1,2,4-trichlorobenzene; 1,1,1-trichloroethane; 1,1,2-trichloroethane; trichloroethylene; triethylamine; triethylene glycol dimethyl ether; 1,3,5-trimethylbenzene; m-xylene; o-xylene; p-xylene; 1,2-dichlorobenzene; 1,3-dichlorobenzene; and 1,4-dichlorobenzene.

61. The method of claim 5 wherein said soft organic material is soluble in at least one inorganic solvent.

62. The method of claim 61 wherein said at least one inorganic solvent comprises water.

63. The system of claim 20 wherein said soft organic material is soluble in at least one organic solvent.

64. The system of claim 63 wherein said at least one organic solvent is selected from the group consisting of: acetic acid; acetone; acetonitrile; aniline; benzene; benzonitrile; benzyl alcohol; bromobenzene; bromoform; 1-butanol; 2-butanol; carbon disulfide; carbon tetrachloride; chlorobenzene; chloroform; cyclohexane; cyclohexanol; decalin; dibromethane; diethylene glycol; diethylene glycol ethers; diethyl ether; diglyme; dimethoxymethane; N,N-dimethylformamide; ethanol; ethylamine; ethylbenzene; ethylene glycol ethers; ethylene glycol; ethylene oxide; formaldehyde; formic acid; glycerol; heptane; hexane; iodobenzene; mesitylene; methanol; methoxybenzene; methylamine; methylene bromide; methylene chloride; methylpyridine; morpholine; naphthalene; nitrobenzene; nitromethane; octane; pentane; pentyl alcohol; phenol; 1-propanol; 2-propanol; pyridine; pyrrole; pyrrolidine; quinoline; 1,1,2,2-tetrachloroethane; tetrachloroethylene; tetrahydrofuran; tetrahydropyran; tetralin; tetramethylethylenediamine; thiophene; toluene; 1,2,4-trichlorobenzene; 1,1,1-trichloroethane; 1,1,2-trichloroethane; trichloroethylene; triethylamine; triethylene glycol dimethyl ether; 1,3,5-trimethylbenzene; m-xylene; o-xylene; p-xylene; 1,2-dichlorobenzene; 1,3-dichlorobenzene; and 1,4-dichlorobenzene.

65. The system of claim 20 wherein said soft organic material is soluble in at least one inorganic solvent.

66. The system of claim 65 wherein said at least one inorganic solvent comprises water.

67. The system of claim 28 wherein said dispersing reagent is soluble in at least one organic solvent.

68. The system of claim 67 wherein said at least one organic solvent is selected from the group consisting of: acetic acid; acetone; acetonitrile; aniline; benzene; benzonitrile; benzyl alcohol; bromobenzene; bromoform; 1-butanol; 2-butanol; carbon disulfide; carbon tetrachloride; chlorobenzene; chloroform; cyclohexane; cyclohexanol; decalin; dibromethane; diethylene glycol; diethylene glycol ethers; diethyl ether; diglyme; dimethoxymethane; N,N-dimethylformamide; ethanol; ethylamine; ethylbenzene; ethylene glycol ethers; ethylene glycol; ethylene oxide; formaldehyde; formic acid; glycerol; heptane; hexane; iodobenzene; mesitylene; methanol; methoxybenzene; methylamine; methylene bromide; methylene chloride; methylpyridine; morpholine; naphthalene; nitrobenzene; nitromethane; octane; pentane; pentyl alcohol; phenol; 1-propanol; 2-propanol; pyridine; pyrrole; pyrrolidine; quinoline; 1,1,2,2-tetrachloroethane; tetrachloroethylene; tetrahydrofuran; tetrahydropyran; tetralin; tetramethylethylenediamine; thiophene; toluene; 1,2,4-trichlorobenzene; 1,1,1-trichloroethane; 1,1,2-trichloroethane; trichloroethylene; triethylamine; triethylene glycol dimethyl ether; 1,3,5-trimethylbenzene; m-xylene; o-xylene; p-xylene; 1,2-dichlorobenzene; 1,3-dichlorobenzene; and 1,4-dichlorobenzene.

69. The system of claim 28 wherein said dispersing reagent is soluble in at least one inorganic solvent.

70. The system of claim 69 wherein said at least one inorganic solvent comprises water.

71. The method of claim 30 wherein said soluble solid organic material is soluble in at least one organic solvent.

72. The method of claim 71 wherein said at least one organic solvent comprises at least one solvent selected from the group consisting of: acetic acid; acetone; acetonitrile; aniline; benzene; benzonitrile; benzyl alcohol; bromobenzene; bromoform; 1-butanol; 2-butanol; carbon disulfide; carbon tetrachloride; chloroform; cyclohexane; cyclohexanol; decalin; dibromethane; diethylene glycol; diethylene glycol ethers; diethyl ether; diglyme; dimethoxymethane; N,N-dimethylformamide; ethanol; ethylamine; ethylbenzene; ethylene glycol ethers; ethylene glycol; ethylene oxide; formaldehyde; formic acid; glycerol; heptane; hexane; iodobenzene; mesitylene; methanol; methoxybenzene; methylamine; methylene bromide; methylene chloride; methylpyridine; morpholine; naphthalene; nitrobenzene; nitromethane; octane; pentane; pentyl alcohol; phenol; 1-propanol; 2-propanol; pyridine; pyrrole; pyrrolidine; quinoline; 1,1,2,2-tetrachloroethane; tetrachloroethylene; tetrahydrofuran; tetrahydropyran; tetralin; tetramethylethylenediamine; thiophene; toluene; 1,2,4-trichlorobenzene; 1,1,1-trichloroethane; 1,1,2-trichloroethane; trichloroethylene; triethylamine; triethylene glycol dimethyl ether; 1,3,5-trimethylbenzene; m-xylene; o-xylene; p-xylene; 1,2-dichlorobenzene; 1,3-dichlorobenzene; and 1,4-dichlorobenzene.

73. The method of claim 30 wherein said soluble solid organic material is soluble in at least one inorganic solvent.

74. The method of claim 73 wherein said at least one inorganic solvent comprises water.

75. The method of claim 52 wherein said dispersing reagent is soluble in at least one organic solvent.

76. The method of claim 75 wherein said at least one organic solvent is selected from the group consisting of: acetic acid; acetone; acetonitrile; aniline; benzene; benzonitrile; benzyl alcohol; bromobenzene; bromoform; 1-butanol; 2-butanol; carbon disulfide; carbon tetrachloride; chlorobenzene; chloroform; cyclohexane; cyclohexanol; decalin; dibromethane; diethylene glycol; diethylene glycol ethers; diethyl ether; diglyme; dimethoxymethane; N,N-dimethylformamide; ethanol; ethylamine; ethylbenzene; ethylene glycol ethers; ethylene glycol; ethylene oxide; formaldehyde; formic acid; glycerol; heptane; hexane; iodobenzene; mesitylene; methanol; methoxybenzene; methylamine; methylene bromide; methylene chloride; methylpyridine; morpholine; naphthalene; nitrobenzene; nitromethane; octane; pentane; pentyl alcohol; phenol; 1-propanol; 2-propanol; pyridine; pyrrole; pyrrolidine; quinoline; 1,1,2,2-tetrachloroethane; tetrachloroethylene; tetrahydrofuran; tetrahydropyran; tetralin; tetramethylethylenediamine; thiophene; toluene; 1,2,4-trichlorobenzene; 1,1,1-trichloroethane; 1,1,2-trichloroethane; trichloroethylene; triethylamine; triethylene glycol dimethyl ether; 1,3,5-trimethylbenzene; m-xylene; o-xylene; p-xylene; 1,2-dichlorobenzene; 1,3-dichlorobenzene; and 1,4-dichlorobenzene.

77. The method of claim 52 wherein said dispersing reagent is soluble in at least one inorganic solvent.

78. The method of claim 77 wherein said at least one inorganic solvent comprises water.

* * * * *

UNITED STATES PATENT AND TRADEMARK OFFICE
CERTIFICATE OF CORRECTION

| | |
|---|---|
| PATENT NO. | : 6,723,299 B1 |
| DATED | : April 20, 2004 |
| INVENTOR(S) | : Chen et al. |

It is certified that error appears in the above-identified patent and that said Letters Patent is hereby corrected as shown below:

Delete title page and substitute with the attached title page.

Drawings,
Replace informal Figures 1-6 with the attached formal versions of Figures 1-6.

Column 1,
Line 61, delete "Cd".
Line 65, delete "an[]".

Column 2,
Lines 35 (both occurrences) and 42, change "Journey" to -- Journet --.

Column 3,
Line 19, delete "if".

Column 5,
Line 62, delete "id".

Column 6,
Line 8, change "γcyclodextrin" to -- γ-cyclodextrin --.
Lines 30 and 35, delete "If".
Line 43, change "of:" to -- of --.

Column 9,
Line 32, change "cyclodextrilnml" to -- cyclodextrin/ml --.
Line 32, change "high-resolufion" to -- high-resolution --.
Line 58, change "cyclodexus" to -- cyclodextrins --.

Column 10,
Line 61, change "engage" to -- encage --.

UNITED STATES PATENT AND TRADEMARK OFFICE
CERTIFICATE OF CORRECTION

PATENT NO.   : 6,723,299 B1
DATED        : April 20, 2004
INVENTOR(S)  : Chen et al.

It is certified that error appears in the above-identified patent and that said Letters Patent is hereby corrected as shown below:

<u>Column 11,</u>
Lines 44 and 45, change "engage" to -- encage --.
Lines 48 and 50, change "engages" to -- encages --.

Signed and Sealed this

Thirtieth Day of May, 2006

JON W. DUDAS
*Director of the United States Patent and Trademark Office*

United States Patent
Chen et al.

(10) Patent No.: US 6,723,299 B1
(45) Date of Patent: Apr. 20, 2004

(54) SYSTEM AND METHOD FOR MANIPULATING NANOTUBES

(75) Inventors: Jian Chen, Richardson, TX (US); Mark J. Dyer, San Jose, CA (US)

(73) Assignee: Zyvex Corporation, Richardson, TX (US)

(*) Notice: Subject to any disclaimer, the term of this patent is extended or adjusted under 35 U.S.C. 154(b) by 72 days.

(21) Appl. No.: 10/044,317

(22) Filed: Jan. 11, 2002

Related U.S. Application Data

(60) Provisional application No. 60/291,101, filed on May 17, 2001.

(51) Int. Cl.$^7$ .................................................. D01F 9/12
(52) U.S. Cl. ......................... 423/447.1; 423/447.2; 423/460; 241/16
(58) Field of Search ......................... 423/447.2, 460, 423/455 R, 447.1; 241/16

(56) References Cited

U.S. PATENT DOCUMENTS 5,482,601 A  1/1996 Ohshima et al.
5,733,608 A  3/1998 Ohk

OTHER PUBLICATIONS

U.S. patent application Ser. No. 60/291,101, Chen.
Ajayan, P.M., "Nanotubes from Carbon," Chem. Rev. 1999, 99, 1787–1799.
Yakobson, Boris I. et al., "Fullerene Nanotubes: $C_{1,000,000}$ and Beyond," American Scientist, 1997, vol. 85, 324–338.
Rinzler, A.G., et al., "Large-scale purification of single-wall carbon nanotubes: process, product, and characterization," Appl. Phys. A 67, 29–37 (1998).
Journet, C., et al., "Large-scale production of single-walled carbon nanotubes by the electric-arc technique," Nature, vol. 388/Aug. 1997, 756–758.
Journet, C., et al., "Production of carbon nanotubes," Appl. Phys. A 67, 1–9 (1998).
Nikolaev, Pavel et al., "Gas-phase catalytic growth of single-walled carbon nanotubes from carbon monoxide," Chemical Physics Letters 313 (1999) 91–97.
Liu, Jie et al., "Fullerene Pipes," Science, vol. 280, 1998, 1253–1256.
Stepanek, I. et al., "Nano–mechanical cutting and opening of single wall carbon nanotubes," Chemical Physics Letter 331 (2000) 125–131.
Szejtli, Jozsef, "Introduction and General Overview of Cyclodextrin Chemistry," Chem. Rev. 1998, 98, 1743–1753.
Chen, Jian et al., "Dissolution of Full–Length Single–Walled Carbon Nanotubes," J. Phys. Chem B 2001, 105, 2525–2528.
Niyogi, S. et al., "Chromatographic Purification of Soluble single–Walled Carbon Nanotubes (s–SWNTs)," J. Am. Chem. Soc., 2001, 123, 733–734.
Dresselhaus, M.S. et al., "Science of Fullerenes and Carbon Nanotubes," 1996, San Diego: Academic Press, 901–918.

Primary Examiner—Stuart L. Hendrickson
Assistant Examiner—Peter J Lish
(74) Attorney, Agent, or Firm—Haynes and Boone, LLP

(57) ABSTRACT

A system and method are disclosed which allow for manipulation of nanotubes. More specifically, embodiments of the present invention enable various types of manipulation of nanotubes utilizing an organic material that is presented to the nanotubes. For example, a preferred embodiment of the present invention enables cutting of nanotubes into shortened nanotubes. Other types of nanotube manipulation that are enabled by embodiments of the present invention, include dispersing nanotubes, enabling dissolution of nanotubes, and noncovalently functionalizing nanotubes. The organic material utilized in manipulating nanotubes preferably comprises a soft organic material, soluble organic material, and/or an organic material that acts as a dispersing reagent for dispersing nanotubes. In a preferred embodiment, the organic material utilized for manipulating nanotubes comprises cyclodextrin.

78 Claims, 10 Drawing Sheets